United States Patent Office 3,417,563
Patented Dec. 24, 1968

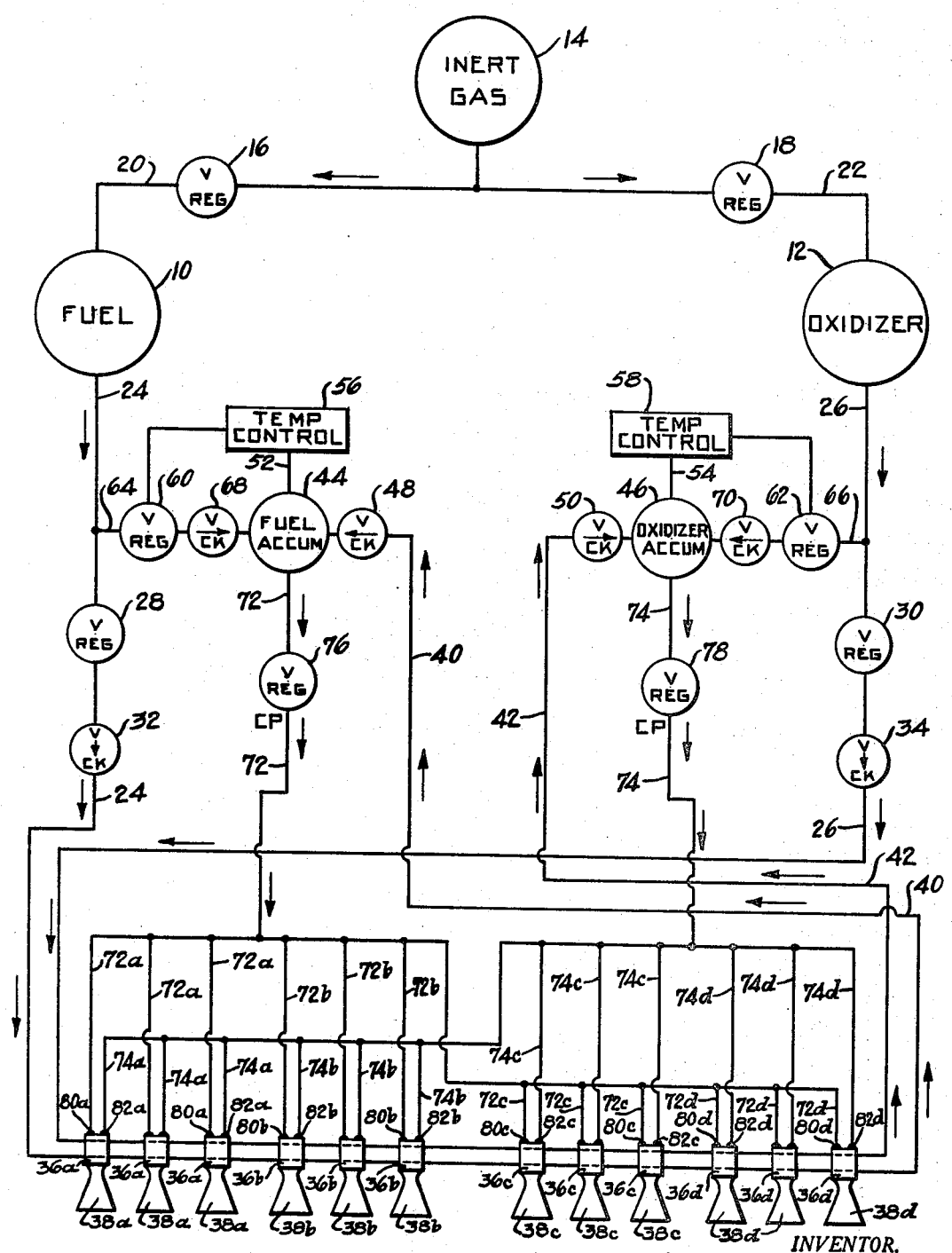

3,417,563
ISOTHERMAL GAS GENERATOR
Joseph F. Loprete, Wayne, N.J., assignor to Curtiss-Wright Corporation, a corporation of Delaware
Filed Mar. 11, 1966, Ser. No. 533,724
10 Claims. (Cl. 60—39.27)

ABSTRACT OF THE DISCLOSURE

A liquid propellant is stored in a tank for use in a rocket engine. The liquid propellant is passed through a heat exchanger structure surrounding the engine combustion chamber such that the combustion chamber wall is cooled by the propellant and the propellant is vaporized by absorbing heat from the combustion gases. The vaporized propellant is then supplied to a storage tank or accumulator. A temperature control means is provided to supply liquid propellant to the accumulator from the storage tank to cool the vaporized propellant to maintain the propellant at a predetermined temperature. A pressure regulating valve is provided between the accumulator and the rocket engine so that the cooled propellant vapor is supplied to the rocket engine at a constant pressure.

This invention relates to an isothermal gas generating means and more particularly to a means for providing gaseous propellants having substantially constant pressure and temperature for combustion in rocket engines or the like.

The use of cryogenic type liquid propellants in non-air breathing engines, such as rocket engines or the like, has presented some problems, particularly where it is desired that the rocket engine be capable of producing a substantially constant thrust output. Due to the characteristics of the cryogenic type propellants, they must be stored at very low temperatures and will readily vaporize in the system if proper insulation is not provided. During flow through the propellant system, it is very difficult to prevent some vaporization of these types of propellants so that it can be seen that there will be changes in the density of the propellants as they flow through the system due to vaporization. As is well known, the thrust output of a rocket engine varies directly with the mass rate of flow of the propellants through the injectors. If, therefore, the density of the propellants varies through the system, the mass flow rate will not be constant, which can result in relatively wide variations in the thrust output.

Further, when using a pulsing type operation, that is, rapid firings of the engine, such as in an attitude control system for a rocket or space vehicle, vaporization of the liquid propellant in the system will result in a reduction of the flow of the propellant to the injectors until the vapor can be quenched by oncoming liquid propellant from a point upstream of the vaporization. Although means can be provided to prevent vaporization to some extent, some vaporization can still occur and cause delays in the engine operation, which cannot be tolerated in an attitude control system since such a system must be ready on demand. It will be apparent that even delays in the tenths of a second at the speed of travel of a rocket vehicle, satellite or space capsule, can result in substantial deviations from a desired course or attitude and may thus require excessive uses of fuel for course or attitude corrections.

It is a prime purpose of the present invention to provide a means for generating gaseous propellants from the liquid cryogenic propellants carried in the main propulsion tanks of a rocket vehicle or the like and to supply the gaseous propellants to the engine injectors under substantially constant pressure and temperature. By controlling the temperature and pressure of the gaseous propellants within predetermined limits, the mass flow rate of the propellants through the injectors and the thrust output of the engine can be maintained at substantially constant levels.

The invention is generally carried out by first causing the liquid propellants to pass through a heat exchanger wherein the liquid propellants are vaporized. Preferably the heat exchanger may comprise a cooling jacket for the propulsion engine so that the heat generated in the engine can be used for vaporizing the propellants while cooling the propulsion engine itself. The heated vaporized propellants are then collected in respective accumulators wherein their temperature is maintained by adding controlled amounts of liquid for cooling down the hot gases. The vaporized propellants or gases are then fed through a pressure regulating means to the engine injectors upon demand so that it will be seen that the supply of the propellant gases to the injectors will be at controlled temperature and pressure levels.

Accordingly, it is one object of the invention to provide a novel isothermal gas generating means.

It is another object of the invention to provide a novel propellant supply system wherein the mass flow rate of the propellants can be maintained substantially at a desired constant level.

It is a further object of the invention to provide a novel propulsion system in which the propulsion engine will be ready for firing on demand without significant ignition delays.

It is an additional object of the invention to provide a novel propulsion system in which the engine can be fired in relatively rapid succession without any significant delay between firings.

It is still another object of the invention to provide a novel propellant supply system for a propulsion system including a plurality of propulsions engines which can be selectively fired and wherein a gaseous propellant is provided having a substantially constant temperature and pressure so that the thrust output of each engine can be maintained substantially constant.

Other objects and advantages of the invention will be best understood upon reading the following detailed description with the accompanying drawings wherein:

FIG. 2 is a schematic view of an attitude control system embodying the invention.

Figure 1:
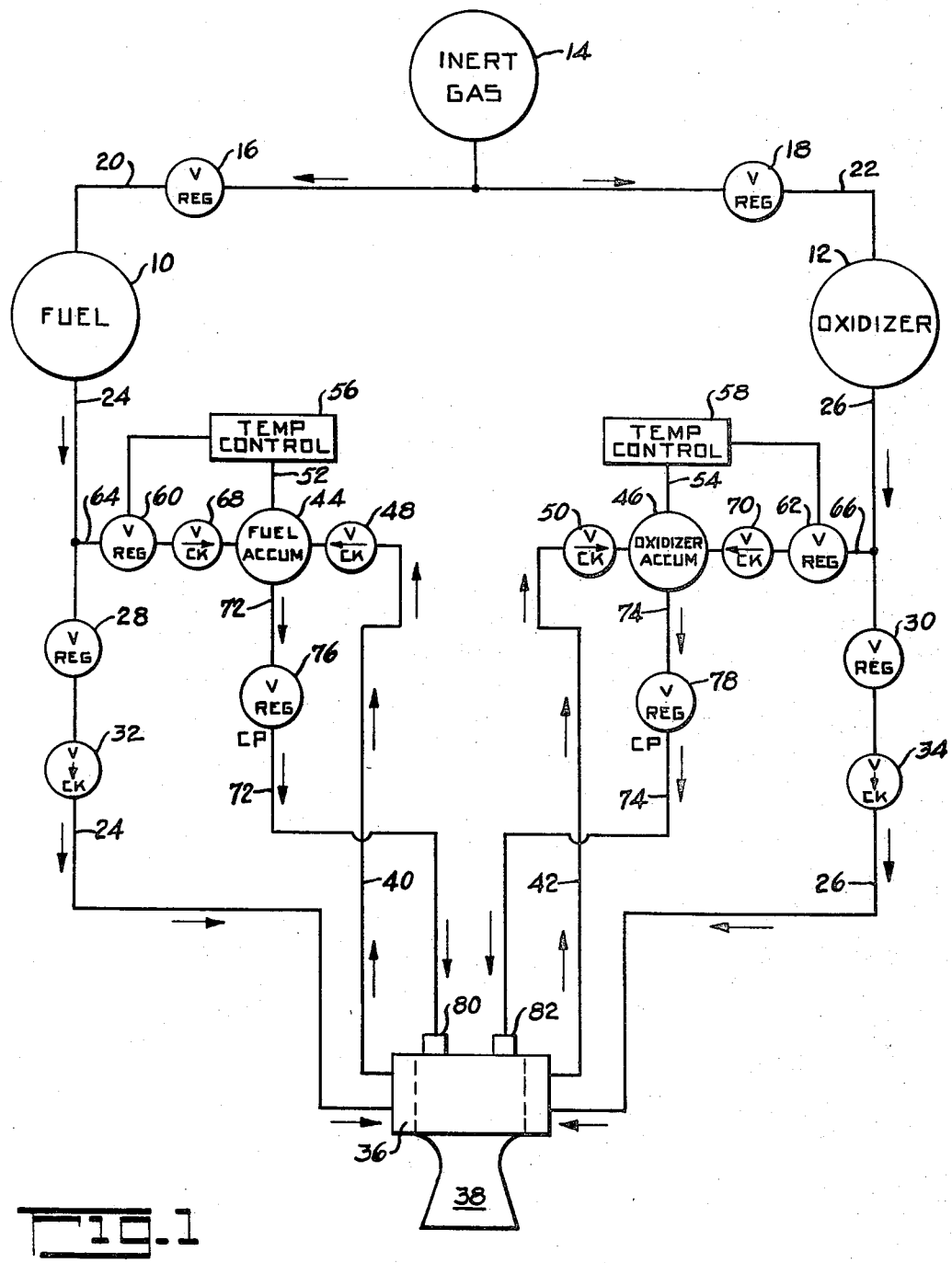
FIG. 1 is a schematic view of a propulsion system embodying the invention.

Referring to FIG. 1, a cryogenic liquid fuel, such as hydrogen, is stored in a tank 10 and a cryogenic oxidizer of a known type is stored in a tank 12. The fuel and oxidizer will both be hereinafter referred to as propellants or fuels. A tank 14 contains an inert gas under pressure, which through regulator valves 16 and 18, lines 20 and 22 leading to the tanks 10 and 12, and a suitable means in the tanks 10 and 12 such as a bladder or the like, forces the fuel and oxidizer from said tanks 10 and 12 into propellant feed lines 24 and 26. Obviously, however, pumps could be substituted for the gas pressurizing system, if desired. The valves 16 and 18, which may also include suitable on-off valves (not shown) for starting and stopping the flow of the inert gas, may be controlled from a suitable control source such as a computer or manually by a pilot. Regulator valves 28 and 30 and check valves 32 and 34 are disposed in the propellant lines 24 and 26, respectively, for regulating the flow of the liquid propellants from the tanks 10 and 12 with the valves 28 and 30 being controlled in a similar manner as the valves 16 and 18. That is, the regulator valves 28 and 30 act in response to a demand signal from a control center (not shown) for regulating the flow rate of the fuel and oxidizer from their respective tanks with the check valves 32 and 34 being operative to insure a one-way flow of said fuel and oxidizer. As will be more fully explained hereinafter, the liquid propellants in the present invention are not injected directly into the combustion chamber of the propulsion engine, as is the usual case, but are first passed through a heat exchanger 36, which in the preferred embodiment is disposed in cooperative relationship with a rocket engine 38.

The cryogenic liquid propellants are normally stored at cryogenic temperatures which are subfreezing temperatures with respect to the freezing temperature of water and are normally far below the vehicle ambient temperature. Although the propellant storage and feed system including the injectors may be insulated in order to prevent the cryogenic propellants from absorbing heat and from vaporizing, this method is not always totally effective and some vaporization of the liquid propellants may occur. Since the propellant system is pressure sensitive, vaporization of the liquid propellants will cause a reduction in the flow rate of said propellants until the propellant vapor can be quenched by additional liquid propellant in the line. Any reduction in the flow will obviously result in variations in the mass flow rate of the propellants through the injector and thus changes in thrust output. This may be particularly critical in an attitude control system for a space vehicle or the like wherein constant thrust output may be desired. Thus, it will be seen that, when using propellants which may readily vaporize, such as the cryogenic liquid propellants, it may be difficult to accurately control the mass flow rate of the propellants and the resulting thrust output.

In accordance with the present invention, the liquid propellants are converted to gaseous form by purposely vaporizing said propellants and supplying said propellants to the injectors with a substantially constant temperature and pressure so that the mass flow rate of the propellants through the injectors will be substantially a constant and thereby provide a substantially constant thrust output.

As stated above, the propellants are each passed through a heat exchanger 36 downstream of their respective storage tanks 10 and 12. As generally illustrated in FIG. 1, the heat exchanger 36 is preferably disposed in heat exchanging relationship with the rocket engine 38. Thus, the heat exchanger 36 may form part of the cooling jacket for the engine 38 so that, in vaporizing the liquid propellant, heat is removed from said engine 38 and cools the engine. This heat is then used for vaporizing the liquid propellants in accordance with the aims of the invention. The heat exchanger 36 may take various forms such as that shown in United States Patent No. 2,958,183, issued Nov. 1, 1960, and no invention is alleged in the heat exchanger itself. Preferably the rocket engine 38 is of the type shown in co-pending application Ser. No. 437,072, filed Mar. 4, 1965, the structure of which forms a very efficient heat sink for vaporizing the liquid propellants. Also, the propellants may be circulated through a structure of the type shown in the rocket engine of co-pending application Ser. No. 367,632, filed May 15, 1964, for cooling the engine structure and vaporizing the propellants. However, it should be understood that the invention, as will be explained in more detail hereinafter, is not limited to use with rocket engines but may be used with any type engine wherein it is desired to generate gases for combustion from stored liquid fuels.

As the propellants are vaporized or converted to a gaseous form in the heat exchanger 36, they are discharged from said heat exchanger 36 through lines 40 and 42, respectively, and are respectively collected in a fuel accumulator tank 44 and an oxidizer accumulator tank 46. Check valves 48 and 50 are respectively disposed in lines 40 and 42 to prevent the gases from flowing back toward the heat exchanger 36, particularly when the system is shut down. As will be apparent, when the gases leave the heat exchanger 36, they will be relatively hot and in order to store and maintain the gases at a pressure within the capacity of the respective accumulator tanks 44 and 46, said gases must be cooled down. Preferably, the gases in the accumulator tanks 44 and 46 are maintained at a temperature well below the ambient vehicle temperature but slightly above the temperature of the liquid propellants in the tanks 10 and 12 so as to insure that the propellants stay in a gaseous form in said tanks 44 and 46 and also to insure that the pressures within the tanks do not become excessive.

Further, in accordance with the invention the gases are preferably maintained at a substantially constant temperature level for delivery to the rocket engine 38. In order to reduce the temperature of the gases as they enter the respective accumulator tanks 44 and 46 and to maintain them at a desired temperature level, a temperature regulating means is provided for regulating the temperature of the gases in said tanks 44 and 46. The temperature regulating means includes a temperature probe disposed for measuring the temperature of the gas in each tank 44 and 46 with said probes being illustrated by lines 52 and 54. The probes 52 and 54 are connected to a temperature control means 56 and 58, respectively, which control means react when the temperature in the tanks is above a predetermined minimum to activate regulator valves 60 and 62 for supplying liquid propellant to the respective tanks 44 and 46 for cooling down the relatively hot gases in said tanks 44 and 46. The liquid propellants are supplied from the main propellant source through lines 64 and 66 connected to the lines 24 and 26, respectively, the regulator valves 60 and 62, check valves 68 and 70 for insuring one-way flow and through suitable spray nozzles (not shown) in the tanks 44 and 46. Thus, when the temperature of the gases in the tanks 44 and 46 is above a predetermined minimum, the temperature controls will react to permit a spray of liquid propellant to be injected into the tanks 44 and 46, which spray mixes with the gases to cool said gases. Since the gases in said tanks 44 and 46 are stored at temperatures preferably well below the ambient vehicle temperature, even when the system is shut down the tanks 44 and 46 may absorb some heat from the surroundings so that the temperature control will also be operative to admit a spray of liquid propellant during shut-down for maintaining the temperatures in the tanks 44 and 46 within the predetermined level. It will also be understood that by controlling the temperature of gases in said tanks 44 and 46, the pressure will also be substantially regulated through the temperature control regulating means.

Discharge lines 72 and 74 are respectively connected to each of the tanks 44 and 46 and have constant pressure regulator valves 76 and 78 respectively disposed in each of said lines 72 and 74. The pressure regulator valves 76 and 78 function to deliver a constant pressure gas feed at their downstream ends to the engine injectors 80 and 82. As explained above, the temperature and the pressure in the tanks 44 and 46 is maintained at a substantially predetermined level. This pressure in said tanks 44 and 46 has a pressure level which is above the output pressure level of the regulator valves 76 and 78 so that upon an opening of said valves 76 and 78 there will be a pressure feed through said valves to the injectors 80 and 82. Upon a demand signal from a suitable control source, the regulator valves 76 and 78 will be opened and will deliver a constant pressure feed at their downstream ends to the injectors 80 and 82 to therefore provide a substantially constant mass flow rate of gas through said injectors 80 and 82 with a resulting constant thrust output.

It will therefore be apparent that the system of the invention provides a means for converting liquid propellants into a gaseous form and for supplying said propellants in the gaseous form at a substantially constant temperature and pressure level to the engine injectors for maintaining a desired constant thrust output for the engine. At the same time, the invention also provides a means for cooling the engine structure which will enhance the life of said engine by lowering the temperature thereof so that erosion of the inner surface of the engine due to the high temperature combustion therein is minimized.

In FIG. 2 there is shown another embodiment of the invention wherein like numerals are used to indicate like elements to those shown in FIG. 1. As can be seen in FIG. 2, the invention shown therein is substantially the same as the embodiments shown in FIG. 1 except that the invention is embodied in a system including a plurality of relatively small rocket engines preferably used in an attitude control system. The rocket engines are preferably arrangned in sets of three, each set being illustrated at 38a, 38b, 38c and 38d, which may be suitably disposed around a rocket vehicle or space vehicle for firing in different directions so as to correct for attitude or course deviation. A suitable control system (not shown) may be provided for firing the engines in individual sets, individually or in groups. In an attitude control system the engines must be ready on demand for instantaneous firing since the timing of firing in such a system can be critical. As briefly explained above, a liquid injection system is not entirely satisfactory since some vaporization of the cryogenic propellants may occur which may reduce the flow of the liquid propellant to the injectors until the vapor can be quenched. Further, attitude control systems must be capable of relatively rapid firing sequences or pulsing. The present invention is intended to overcome the disadvantages which may be present in a liquid injection system by providing a gaseous injection system which is capable of relatively rapid short firing sequences.

Referring to FIG. 2, the liquid propellant lines 24 and 26 have their inputs connected in series to the heat exchangers 36a, 36b, 36c and 36d so that, if any one of the rocket engines is firing, the liquid propellant will be vaporized as it passes through the heat exchanger. Therefore, whether one or all of the engines is firing, vaporization will occur to produce a gaseous form from the liquid propellant which is carried by the lines 40 and 42 to the respective fuel accumulator 44 or oxidizer accumulator 46. The output line 72 from the fuel accumulator 44 is connected to a series of lines 72a, 72b, 72c and 72d which in turn are connected to the respective fuel injectors 80a, 80b, 80c and 80d of the associated individual rocket engines. Likewise, the output lines 74 of the oxidizer accumulator 46 are connected to series of lines to the associated injectors 82a, 82b, 82c and 82d. The individual injectors are connected to a control system through which said injectors may be activated in a desired sequence for firing one or several engines as demanded by the control center. Such systems are known in the art and no invention is claimed in the control system itself for selectively activating the injectors. From the embodiment of FIG. 2 it will be seen that the gas generating system of the invention provides a novel and reliable means for providing gaseous propellants under substantially constant temperature and pressure so that the engines may be substantially instantaneously fired and will produce a substantially constant thrust output.

The operation of the embodiments of FIGS. 1 and 2 is as follows: Initially a supply of gas is provided in the fuel accumulator 44 and the oxidizer accumulator 46 to start operation. Upon a demand signal the regulator valves 76 and 78 will be opened along with the engine injectors to provide a supply of gaseous propellants to the engines for firing the same. As the engines fire, the control signal will have also initiated a supply or flow of fuel and oxidizer in liquid form through the heat exchangers wherein the liquid propellants will absorb heat to vaporize said propellants and cool the engines, which vaporized propellants are circulated to the respective accumulators wherein the gases will collect for supply to the engine injectors. As explained above, even during shut-down of the system the fuel and oxidizer in the accumulators 44 and 46 will be maintained at a substantially constant temperature and pressure through the temperature regulating means which pressure will be above the constant pressure output of the regulator valves 76 and 78. As the gases are supplied through said regulator valves 76 and 78, the output pressure will be maintained constant by said regulator valves so that the gases reaching the injectors for the rocket engines, or engine as in FIG. 1, will be under a substantially constant pressure so that the mass flow rate of the propellants through the injectors will be maintained at a substantially constant level for producing the desired constant thrust output from the rocket engines.

While the invention has been described in its preferred embodiments, it should be understood that various modifications of the invention may be made without departing from the spirit and scope thereof as defined in the appending claims. For example, the gas generating means of the invention is not limited to rocket engines but may be used in other forms of non-air breathing engines wherein it is desired to enjoy the benefits of the functions of the invention.

What is claimed is:

1. A gas generating system for supplying a gas to the combustion chamber of at least one combustion engine including: storage means for storing a liquid fuel; passage means for transporting said liquid fuel from said storage means, said passage means being operably connected to said combustion engine at its downstream end; means operably connected to said passage means for converting said liquid fuel to a gas upstream of the combustion chamber of said combustion engine; temperature regulator means for maintaining the temperature of said gas including means for cooling said gas in said passage means below a predetermined maximum temperature; and pressure regulator means for regulating the pressure of said gas in said passage means such that during engine operation the density of said gas supplied to the combustion chamber of said combustion engine will be controlled by said temperature regulator means and said pressure regulator means.

2. A gas generating system as recited in claim 1 further comprising accumulator means for collecting and storing said gas upstream of said combustion engine and said temperature regulator means being operably connected to said accumulator means for cooling the gas in said accumulator means below a predetermined maximum temperature.

3. A gas generating system as recited in claim 2 wherein said temperature regulator means includes means responsive to increases in the temperature of said gas in said accumulator means for supplying liquid fuel to said accumulator means for decreasing the temperature of said gas in said accumulator means.

4. A gas generating system as recited in claim 2 wherein said pressure regulator means includes pressure regulator valve means disposed in said passage means downstream of said accumulator means with said pressure regulator valve means being operative for producing a constant pressure output at its downstream side.

5. A gas generating system as recited in claim 1 wherein said temperature regulator means includes control means operably connected to said passage means upstream of said means for converting said liquid fuel to a gas and said control means being responsive to increases in the temperature of said gas in said passage means for injecting liquid fuel into the gas in said passage means in amounts sufficient to reduce the temperature of said gas below a predetermined maximum temperature.

6. A gas generating system as recited in claim 1 wherein said pressure regulator means includes regulator valve means disposed in said passage means upstream of said combustion engine with said regulator valve means having a constant pressure output so that the pressure of said gas supplied to the combustion chamber of said combustion engine will be maintained at a substantially constant level during engine operation.

7. A gas generating system as recited in claim 1 wherein said means for converting said liquid fuel to a gas comprises cooling jacket means disposed in cooperation with said combustion engine for removing heat from said combustion engine whereby the heat from said combustion engine is operative to vaporize the liquid fuel in said cooling jacket means.

8. A gas generating system as recited in claim 1 wherein said gas generating system is operative for supplying a gas to the combustion chamber of each of a plurality of combustion engines.

9. A gas generating system as recited in claim 8 wherein said means for converting said liquid fuel to a gas comprises cooling jacket means disposed in cooperation with each of said combustion engines for removing heat from said engines and for converting said liquid fuel to a gas.

10. A gas generating system as recited in claim 9 wherein the cooling jacket means of said combustion engines are connected in series so that during operation of at least one of said combustion engines heat will be removed therefrom for converting the liquid fuel to a gas.

References Cited

UNITED STATES PATENTS

| | | | |
|---|---|---|---|
| 2,788,779 | 4/1957 | Mengelkamp | 62—52 |
| 2,960,839 | 11/1960 | Hoag | 62—52 |
| 3,018,626 | 1/1962 | Chestek | 60—267 |
| 3,069,849 | 12/1962 | Crim | 60—240 |

OTHER REFERENCES

Aviation Week, Dec. 7, 1959, p. 30, copy in 60/260.

MARTIN P. SCHWADRON, *Primary Examiner.*

DOUGLAS HART, *Assistant Examiner.*

U.S. Cl. X.R.

60—39.27, 240; 62—52